United States Patent [19]

Suzuki

[11] 3,960,101
[45] June 1, 1976

[54] SHIPS FOR TRANSPORTING IRON ORE PELLETS

[75] Inventor: Hideo Suzuki, Mito, Japan

[73] Assignee: Mitsui Shipbuilding & Engineering Co., Ltd., Tokyo, Japan

[22] Filed: July 22, 1974

[21] Appl. No.: 490,646

[30] Foreign Application Priority Data
Aug. 27, 1973 Japan............................ 48-96024

[52] U.S. Cl.................................. 114/73; 98/53;
114/211
[51] Int. Cl.² .............................. B63B 25/04
[58] Field of Search.................. 114/73, 211, 26; 34/210, 215; 98/53, 56; 75/3

[56] References Cited
UNITED STATES PATENTS

| | | | |
|---|---|---|---|
| 82,887 | 10/1968 | Somes | 98/53 |
| 120,108 | 10/1971 | Sampson | 98/53 |
| 2,160,831 | 6/1939 | Colby et al. | 114/211 X |
| 2,196,391 | 4/1940 | Gronert | 98/56 |
| 2,241,375 | 5/1941 | Campbell | 34/215 |
| 2,466,362 | 4/1949 | Blake | 98/56 |
| 2,738,749 | 3/1956 | Macy et al. | 114/26 |
| 3,285,711 | 11/1966 | Stanford | 114/0.5 R |
| 3,365,339 | 1/1968 | Beggs et al. | 75/3 |

Primary Examiner—Trygve M. Blix
Assistant Examiner—Gregory W. O'Connor
Attorney, Agent, or Firm—Charles W. Helzer

[57] ABSTRACT

In a ship for transporting cold pellets of iron ore a perforated piping is arranged in the holds of the ship and exhaust gas from the boiler or engine of the ship is ejected into the cold pellets loaded in the holds through the perforations of the piping thus drying and hardening the pellets during the voyage.

10 Claims, 6 Drawing Figures

U.S. Patent   June 1, 1976   3,960,101
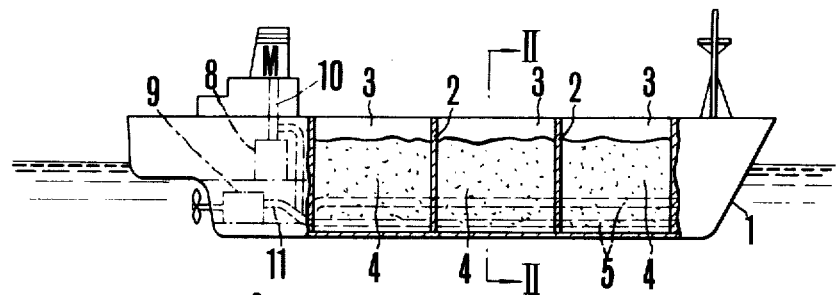
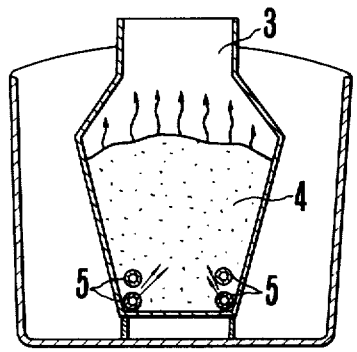
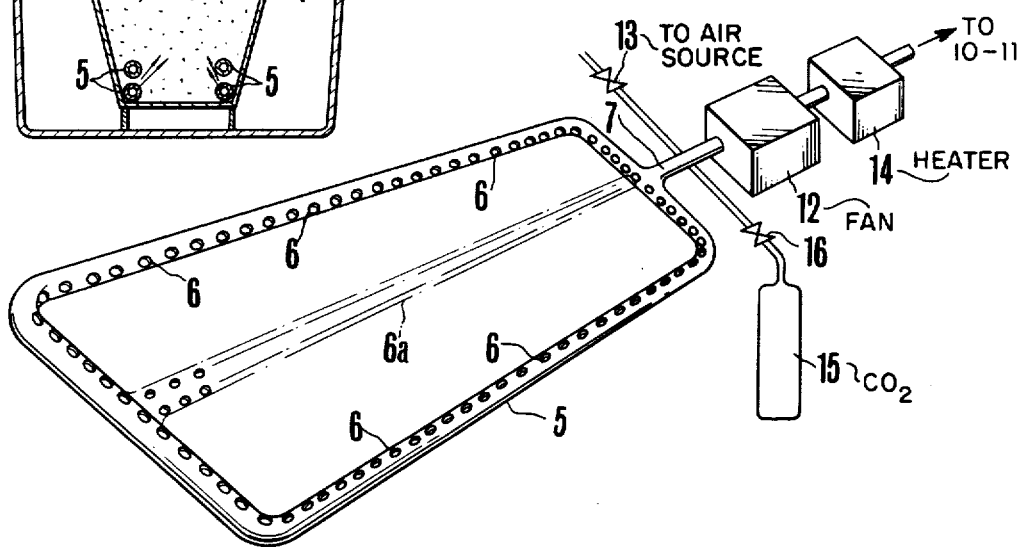
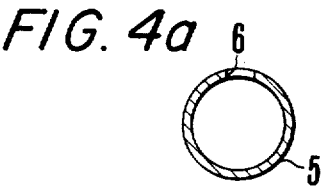 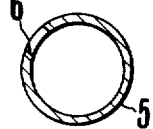 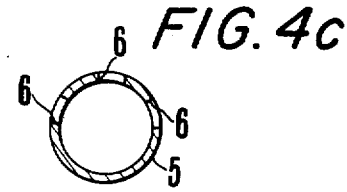

SHIPS FOR TRANSPORTING IRON ORE PELLETS

BACKGROUND OF THE INVENTION

This invention relates to a cargo ship for transporting not fired iron ore pellets (hereinafter termed cold pellets) from a remotely located not firing pellet plant wherein the cold pellets on board are heated to a suitable temperature by a suitable heating device installed in the holds so as to accelerate the hydration reaction of a binder such as cement and to remove excessive water by evaporation.

Since the cold pellets are prepared by bonding together fine powders of iron ore with a binder such as cement or the like, it is necessary to age the cold pellets for about four weeks in order to give strength to the pellets sufficient to withstand the handling operation for loading and unloading. However, the speed of the hydration reaction of cement is low, and usually several percent of not yet reacted water remains in the pores of the pellets. It has been determined by experiments that the crushing strength of the pellets can be increased by twofold or more when such residual water is removed by heating pellets to a temperature of from 100° to 200°C.

The crushing strength of the cold pellets is generally about one half of that of the fired pellets so that when heated to the temperature described above the mechanical strength of the cold pellets can be increased to a value comparable with that of the fired pellets for use as the raw material to be charged in blast furnaces. Where a large number of cold pellets containing a large quantity of water is charged in a blast furnace, the temperature of the gas exhausted from the furnace top is decreased thus decreasing the efficiency of a dust collector associated with the blast furnace.

For this reason, it is advantageous to dry cold pellets before use with the heat of exhaust gas from an engine or boiler while they are being transported by a ship. The use of the heat of exhaust gas decreases the cost of heating the cold pellets and eliminates any drying step after unloading. Moreover, the mechanical strength of the cold pellets is increased before unloading so that it is possible to decrease crushing of the cold pellets during unloading and subsequent handling.

SUMMARY OF THE INVENTION

Accordingly, it is an object of this invention to provide a ship for transporting cold pellets of iron ore capable of drying and hardening the cold pellets during the voyage so that crushing of the pellets at the time of unloading can be minimized.

Another object of this invention is to provide a ship for transporting cold pellets of iron ore capable of drying and hardening the cold pellets by utilizing the heat of the exhaust gas of the boiler and or engine of the ship so that it is possible to economically dry and harden the cold pellets without the addditional cost of using any extra source of heat.

According to this invention, these and further objects can be accomplished by providing a ship for transporting iron ore pellets wherein the iron ore pellets are loaded in the holds of the ship. The ship is characterized in that a perforated piping is arranged in the holds of the ship, and that exhaust gas from the boiler and/or engine of the ship is ejected through the perforations of the pipings for drying and hardening the iron ore pellets during transportation.

In this manner, it is possible to dry and harden the cold pellets in an economical manner during the voyage by using the heat of exhaust gas from the engine and/or boiler of the ship so that not only crushing of the pellets during subsequent handling can be minimized but also unloaded pellets can be immediately charged in blast furnaces without greatly decreasing the temperature of the exhaust gases from the furnaces, thus greatly saving time and cost.

Where necessary, it is possible to use a fan for effecting forced circulation of the exhaust gas. Further, where the heat quantity of the exhaust gas is not sufficient, it is possible to add additional heat to it. Conversely, where the temperature of the exhaust gas is too high, its temperature can be reduced by cooling the exhaust gas or by admixing ambient air with the exhaust gas. Further, where the content of $CO_2$ gas in the exhaust gas is not sufficient $CO_2$ gas may be supplemented from a source of $CO_2$ gas.

BRIEF DESCRIPTION OF THE DRAWINGS

In the accompanying drawing,

FIG. 1 shows a side view, partly in section, of a cargo ship embodying the invention for transporting cold pellets of iron ore;

FIG. 2 is a cross-sectional view of the ship shown in FIG. 1 taken along a line II—II;

FIG. 3 is a perspective view of a piping system for ejecting exhaust gas into the cargo hold, and FIGS. 4a, 4b and 4c are cross-sectional views of the piping used in the piping system for ejecting exhaust gas showing different manners of providing perforations.

DESCRIPTION OF THE PREFERRED EMBODIMENT

A cargo ship 1 for transporting cold pellets is divided by partition walls 2 into a plurality of holds 3 for accommodating cold pellets 4 which have not been hardened before loading. At the bottom of the holds 3 is disposed a piping system 5 for ejecting exhaust gas, as shown in FIG. 3. As shown in FIGs. 4a, 4b and 4c, the piping forming the piping system 5 is provided with a plurality of openings 6 which are directed to eject exhaust gas in the desired directions depending upon the condition of loading of the cold pellets. The piping system 5 is connected through a pipe 7 to exhaust pipes 10 and 11 of a boiler 8 and an engine 9 of the ship. Where the pressure of the exhaust gas is not sufficiently high, a fan 12 for forcing the exhaust gas into the piping 5 may be connected in series with pipe 7. Further, where the temperature of the exhaust gas is high, an air inlet valve 13 may be provided for lowering the temperature of the exhaust gas, and where the temperature of the exhaust gas is too low a suitable heating device 14 may be provided near fan 12. Where the concentration of $CO_2$ component in the exhaust gas which is necessary to enhance hardening of the cold pellets is low, a source of $CO_2$ 15 may be connected to pipe 7 via a suitable valve 16.

Although in the arrangement shown in FIG. 3, the piping 5 takes the form of a flat rectangle, a perforated pipe 6a may be added at the central portion. Alternatively, the piping may be arranged in a grid configuration, or a plurality of pipings similar to that shown in FIG. 3 may be disposed at different levels in the holds. Two pipings at different levels are shown in FIGS. 1 and 2.

The supper surfaces of the holds may be coated with corrosion resistant coating material or heat insulating coating material.

Since the mechanical strength of the cold pellets before hardening is low, it is advantageous to use a spiral shoot or the like for loading the cold pellets.

According to this invention, the cold pellets are hardened by the exhaust gas from an engine or a boiler while they are transported by a cargo ship. Usually the time of the voyage is sufficiently long to perfectly dry and harden the cold pellets so that their mechanical strength can be increased to withstand subsequent handling including unloading.

Although the invention has been shown and described in terms of a preferred embodiment thereof it will be clear that many changes and modifications will be obvious to one skilled in the art without departing from the spirit and scope of the invention as defined in he appended claims.

What is claimed is:

1. A ship for transporting iron ore pellets, and the like, said ship having holds for loading said pellets and a hardening system for drying and hardening the pellets loaded in the holds, said hardening system including a piping system formed from a network of perforated pipes arranged in said holds and means for connecting the exhaust gas pipe of the propulsion boiler and/or propulsion engine of said ship to said piping system for ejecting the exhaust gas through the perforations of the perforated pipes onto the pellets loaded in the holds.

2. The ship according to claim 1 wherein said piping system is disposed on the bottom floor of said holds.

3. The ship according to claim 1 wherein a plurality of different networks of perforated pipes are installed at different levels in said holds.

4. The ship according to claim 1 wherein a fan is connected between said piping system and said exhaust piping for forcing the exhaust gas into said piping system.

5. The ship according to claim 1 which further comprises an air inlet valve connected to said piping system for introducing mixing air into the exhaust gas and for controlling the temperature of the exhaust gas.

6. The ship according to claim 1 wherein said hardening system further includes a heating device for heating said exhaust gas prior to supply of the exhaust gas to the piping system.

7. The ship according to claim 1 wherein said hardening system further includes a source of $CO_2$ gas and means for admitting $CO_2$ gas into said piping system along with the exhaust gas.

8. The ship according to claim 4 which further comprises an air inlet valve connected to said piping system for introducing mixing air into the exhaust gas and for controlling the temperature of the exhaust gas.

9. The ship according to claim 8 wherein said hardening system further includes a heating device for heating said exhaust gas prior to supply of the exhaust gas to the piping system.

10. The ship according to claim 9 wherein said hardening system further includes a source of $CO_2$ gas and means for admitting $CO_2$ gas into said piping system along with the exhaust gas.

* * * * *